Dec. 4, 1951  F. C. BIGGERT, JR  2,577,508
UNIVERSAL COUPLING
Filed Nov. 6, 1947
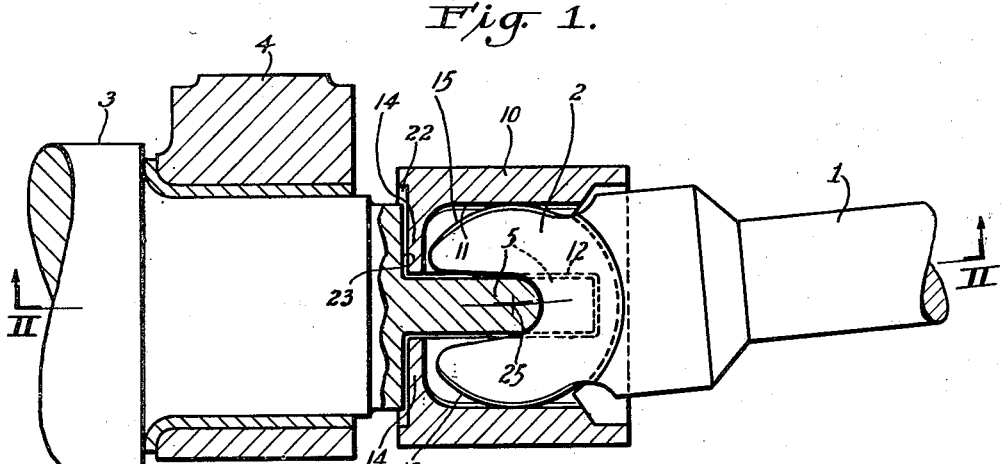
Fig. 1.
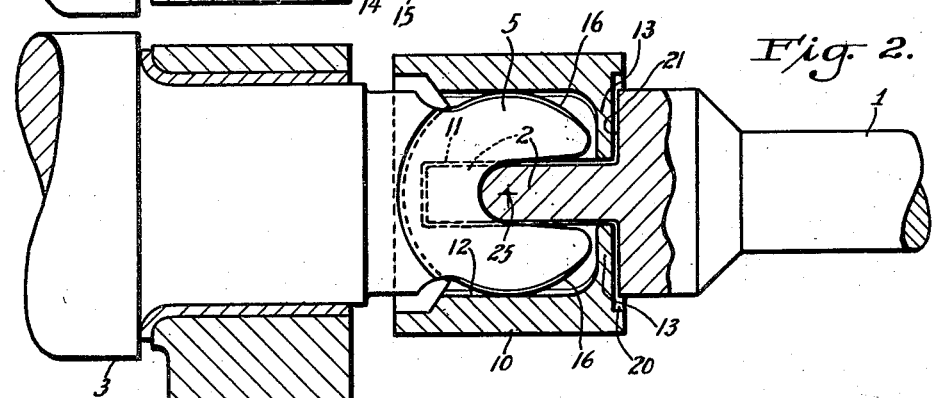
Fig. 2.
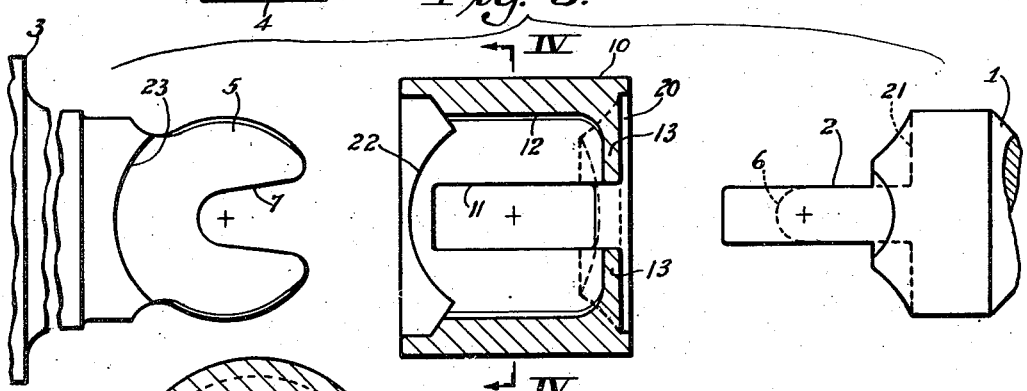
Fig. 3.
Fig. 4.
INVENTOR
Florence C. Biggert Jr.
BY J. E. Dickinson
ATTORNEY Patented Dec. 4, 1951

2,577,508

UNITED STATES PATENT OFFICE 2,577,508

UNIVERSAL COUPLING

Florence C. Biggert, Jr., Pittsburgh, Pa., assignor to United Engineering & Foundry Company, Pittsburgh, Pa., a corporation of Pennsylvania Application November 6, 1947, Serial No. 784,390

2 Claims. (Cl. 64—8)

This invention relates to universal couplings of the type disclosed in my Patent No. 1,908,307. While the invention is unlimited to any particular use, it is especially applicable to universal couplings used between the ends of rolling mill rolls and spindles or wobblers for driving the rolls.

The object is to provide a universal coupling of the type stated having increased strength and durability, which is simple in construction and economical to manufacture, and in which loose play between its parts is smaller.

The invention is illustrated in the accompanying drawing, of which Fig. 1 is a vertical central sectional view of the coupling applied to the adjacent ends of a roll-driving spindle and a rolling mill roll; Fig. 2 a sectional view similar to Fig. 1 showing the coupling, spindle and roll rotated 90°, but indicating the spindle in axial alignment with the roll; Fig. 3 an exploded view of a part of the coupling; and Fig. 4 a transverse sectional view of the coupling box taken on the line IV—IV, Fig. 3.

The universal coupling provided according to this invention comprises a driving and a driven member whose adjacent ends are provided with cruciflat-faced tongues that are centrally bifurcated at their outer ends. The tongue of one member is perpendicular to that of the other, and the bifurcated portion of each tongue embraces the unbifurcated portion of the other. These tongues lie within an annular coupling box which is provided interiorly with a cruciform aperture, the arrangement being such that torque is transmitted from the driving member through the cooperating flat faces of the tongues and of the cruciform apertures to the driven member.

Each end of the coupling box is provided with a transverse wall that overhangs the outer end of at least one of the bifurcations of one of the tongues, but preferably the outer ends of the box are provided with two such walls that overhang the outer ends of both of the bifurcations of the tongues. Also, the exteriors of the transverse walls and portions of the driving and driven members adjacent to them are provided with curved faces that cooperate with each other to maintain the box in operative position with relation to the tongues, such curved surfaces preferably being cylindrical and having a common center of curvature that is located on the longitudinal axis of the box at or near its center of operation.

Having reference now to the illustrated embodiment of the invention, one end of a roll driving wobbler or spindle 1 is provided with a flat-faced tongue 2 which is bifurcated centrally at its outer end. Similarly, the outer end of a roll 3, which is somewhat diagrammatically shown as being supported by a roll housing 4, is provided with a like flat-faced tongue 5 whose outer end is bifurcated. The bifurcations of tongue 2 embrace the unbifurcated portion of tongues 5, and the bifurcations of tongue 5 embrace the unbifurcated portion of tongue 2. The crotches of the tongue bifurcations are illustrated as being seated against each other at the center of the coupling, but in normal operation there may be a clearance between the crotch faces due to a small amount of loose play for which provision is preferably made. As indicated particularly in Fig. 3, the adjacent crotch faces 6 and 7 on tongues 2 and 5, respectively, are similarly curved in two directions at right angles to each other freely to permit misalignment of the axes of spindle 1 and roll 3 within the limits of the angular flare of the adjacent faces of the bifurcated ends of the tongues.

The nested bifurcated tongues 2 and 5 lie within an annular coupling box 10, which, as shown particularly in Fig. 4, is provided with a cruciform aperture having portions 11 and 12 extending at right angles to each other, within which tongues 2 and 5 lie. These apertures have flat faces that cooperate with the flat faces of the tongues for transmitting torque from the driving to the driven members of the coupling. As shown in Fig. 2, the right end of box 10 is provided with transverse walls 13 that overhang the outer ends of the bifurcations of tongue 5, and partially close one end of aperture 12; and as shown in Fig. 1, the left end of the coupling box is provided with like transverse walls 14 that overhang the outer ends of the bifurcations of tongue 2, and partially close one end of aperture 11. To permit freedom of movement between the tongues and the coupling box in all of the contemplated angular misalignments of the axes of the driving and driven members, the outer ends of the bifurcations of tongue 5 are spaced from the inner faces of walls 13, and the outer ends of the bifurcations of tongue 2 are spaced from the inner faces of walls 14. However, such clearances are not large so that substantial axial movements of coupling box 10 in either direction are prevented by the engagement of its transverse walls 13 and 14 with the outer ends of tongues 5 and 2, respectively. To prevent material lateral play of the coupling box and to permit of the necessary relative rocking movements of the coupling parts for contemplated misalignment, the outer edges 15 of tongue 2 and the outer edges 16 of tongue 5 are convexly curved, and between such edges and the interior surfaces of the coupling box at the outer ends of apertures 11 and 12 there is relatively little clearance.

Further to maintain the coupling box in its operative position with little loose play between it and tongues 2 and 5, the exterior faces of transverse walls 13 are provided with cylindrical surfaces 20 that cooperate with cylindrical faces 21 formed at the end of spindle 1 adjacent to the base of tongue 2, and the exterior of walls 14 are provided with cylindrical surfaces 22 that similarly cooperate with cylindrical faces 23 formed on the end of the neck of roll 3 adjacent to the base of tongue 5. These cylindrical faces have a common center of curvature that is located on the longitudinal axis of coupling box 10 at its operating center 25, which, as shown in Figs. 1 and 2, is preferably at or adjacent to the centers of the crotches of the bifurcations of tongues 2 and 5.

In universal couplings of the type here contemplated that have been used, it has been necessary to make provision for considerable loose play between the coupling box and the ends of the spindles or wobblers and the rolls driven by them in order to compensate for the requisite amount of misalignment of the spindles and rolls. In the universal coupling provided according to this invention, much less clearance between the parts, and consequent reduction in loose play, is effected for free relative movements of the parts throughout substantial misalignments of the axes of the driving and driven members. By machining the coupling box and the end portions of the driving and driven members, such a close fit of these cooperating parts may be effected that there is no appreciable loose play, but in most cases such machinery is not feasible because of the difficulty of machining the interior surfaces of the coupling box. However, such machining is unnecessary because by reason of the construction of the coupling the box may be cast to a relatively close fit with provision for only a small amount of clearance and consequent loose play. In forming or assembling the coupling, it is necessary to move the driving or driven member laterally upon its longitudinal axis. This can readily be done in the changing of rolls in mills of the type in which such changes are made through the open sides of roll housings.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A universal coupling comprising a driving and a driven member having adjacent ends each of which is provided with a flat-faced tongue whose outer end is centrally bifurcated, the tongue of one member being perpendicular to that of the other, and the bifurcated portion of each tongue embracing the unbifurcated portion of the other, and an annular coupling box provided interiorly with a cruciform aperture within which said tongues and their bifurcated ends lie, each end of the coupling box being provided with transverse walls that overhang the outer ends of the bifurcations of one of said tongues, the exteriors of said walls and portions of said driving and driven members adjacent thereto being provided with cooperating curved faces for maintaining said box in operative position on said tongues.

2. A universal coupling comprising a driving and a driven member having adjacent ends each of which is provided with a flat-faced tongue whose outer end is centrally bifurated, the tongue of one member being perpendicular to that of the other, and the bifurcated portion of each tongue embracing the unbifurcated portion of the other, and an annular coupling box provided interiorly with a cruciform aperture within which said tongues and their bifurcated ends lie, each end of the coupling box being provided with transverse walls that overhang the outer ends of the bifurcations of one of said tongues, the exteriors of said walls and portions of said driving and driven members adjacent thereto being provided with cooperating cylindrical faces having a common center of curvature located on the longitudinal axis of said box for maintaining the box in operative position on said tongues.

FLORENCE C. BIGGERT, Jr.

REFERENCES CITED

The following references are of record in the file of this patent:

UNITED STATES PATENTS

| Number | Name | Date |
|---|---|---|
| 691,274 | Kennedy | Jan. 14, 1902 |
| 1,908,307 | Biggert, Jr. | May 9, 1933 |